United States Patent [19]
Clokie

[11] Patent Number: 4,787,115
[45] Date of Patent: Nov. 29, 1988

[54] WINDSCREEN WIPERS

[75] Inventor: Andrew K. Clokie, Coventry, England

[73] Assignee: Jaguar Cars Limited, England

[21] Appl. No.: 63,120

[22] Filed: Jun. 17, 1987

[30] Foreign Application Priority Data

Jun. 24, 1986 [GB] United Kingdom ............... 8615385

[51] Int. Cl.$^4$ ............................ B60S 1/12; B60S 1/22
[52] U.S. Cl. ............................ 15/250.21; 15/250.23;
15/250.35; 15/250.41
[58] Field of Search ........... 15/250.21, 250.23, 250.35,
15/250.4, 250.41

[56] References Cited

U.S. PATENT DOCUMENTS

| 2,494,408 | 1/1950 | Rice | 15/255 |
|---|---|---|---|
| 2,629,891 | 3/1950 | Greene | 15/253 |
| 3,092,865 | 6/1963 | Massoud | 15/250.23 |

FOREIGN PATENT DOCUMENTS

| 795541 | 1/1936 | France | 15/250.23 |
|---|---|---|---|
| 1162324 | 4/1958 | France | 15/250.23 |
| 1367869 | 3/1973 | United Kingdom . | |
| 1429807 | 8/1973 | United Kingdom . | |

*Primary Examiner*—Peter Feldman
*Attorney, Agent, or Firm*—Davis, Bujold & Streck

[57] ABSTRACT

A windscreen wiper mechanism includes a wiper arm having a second member mounted on the first member so that it is movable axially with respect thereto. The first member is adapted to be mounted so that it may be driven in reciprocating manner about a pivot. Fluid operated means is mounted on the arm for movement therewith and is controlled by cam means mounted in fixed relationship to the pivot so as to extend and retract the arm in response to angular movement of the arm about the pivot.

5 Claims, 1 Drawing Sheet

WINDSCREEN WIPERS

BACKGROUND TO THE INVENTION

The present invention relates to windscreen wipers for vehicles and in particular to windscreen wipers of the kind in which a wiper blade is mounted upon an arm for reciprocal pivotal movement over the windscreen.

With simple wiper mechanisms of the this type, the wiper blade sweeps an arcuate path over the windscreen which provides limited coverage of the windscreen. Such wipers are normally used in pairs, the arcuate paths of which overlap to provide adequate coverage of the windscreen. With the shape of windscreens on modern vehicles and also to reduce the complexity of the drive mechanism, there has been a tendency on modern vehicles to adopt single wiper systems. However, in order to improve the area of windscreen covered by such systems, it has been proposed to modify the arcuate path of the wiper blade by extending the arm axially as it pivots. However, in the systems proposed hitherto, a separate drive means or complex mechanical linkage has been required, in order to provide axial movement of the arm.

SUMMARY OF THE INVENTION

According to one aspect of the present invention a windscreen wiper mechanism comprises a wiper arm including first and second members mounted with respect to one another so as to permit axial movement of one member relative to the other to vary the length of the arm, mounting means being provided on said first member by means of which the arm may be secured to a pivot about which it may be driven in reciprocating manner, and means being provided on said second member by means of which a wiper blade may be attached, a cam being mounted in fixed relationship to said pivot and a fluid operated means being mounted upon the arm for movement therewith, said fluid operated means being controlled by a cam follower which engages and follows the cam as the arm is moved about the pivot, said fluid means controlling axial movement of the second member relative to the first.

With the wiper mechanism described above, movement of the wiper arm relative to the cam controls axial movement of the wiper blade, without the need for a secondary drive means or a complex mechanical linkage. The fluid operated means is arranged to multiply movement of the cam follower, to provide the required axial movement of the wiper blade.

A secondary fixed wiper blade may be provided on the wiper arm to cover the area of the inner part of the sweep, which would otherwise be missed by the main wiper blade as the arm is extended.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figures 1, 2:
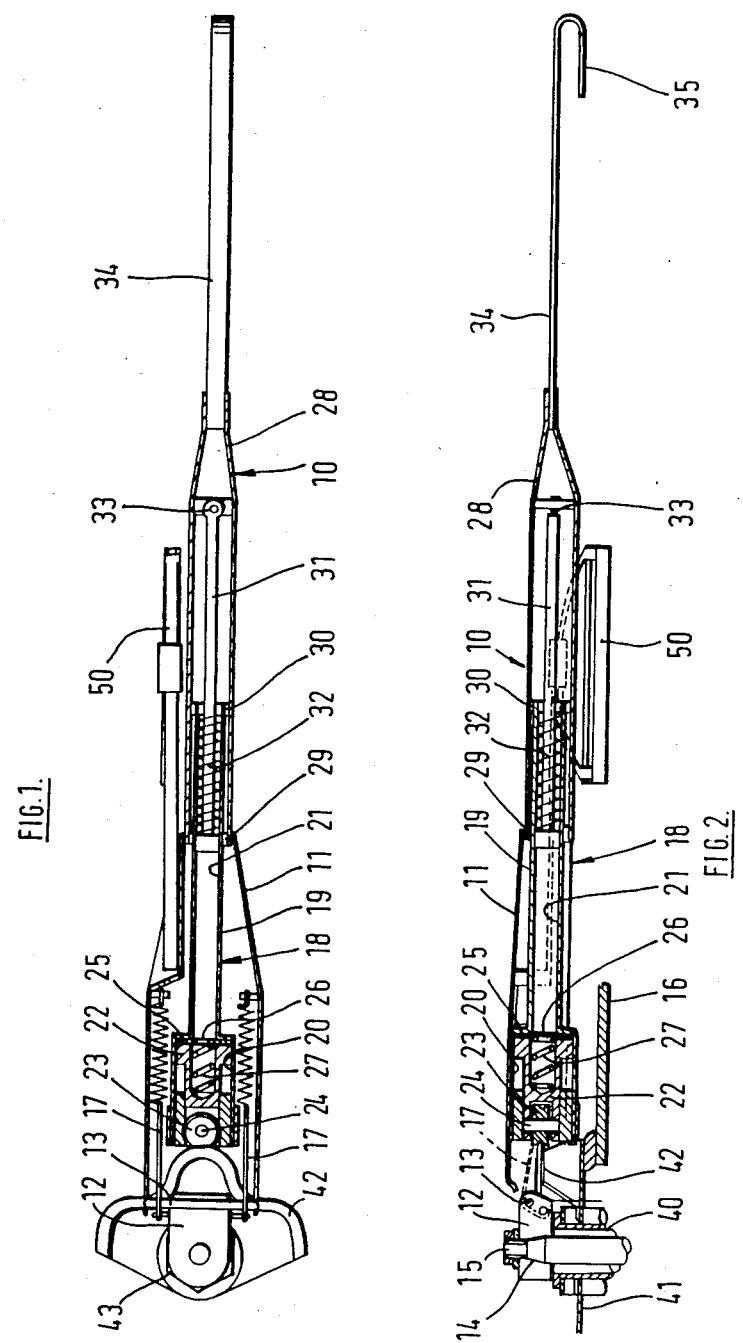
FIG. 1 shows a sectional plan view of a windscreen wiper mechanism formed in accordance with the present invention.
FIG. 2 shows a sectional side elevation of the windscreen wiper mechanism shown in FIG. 1.

FIGS. 1 and 2 illustrate a windscreen wiper mechanism having an arm 10. The arm 10 comprises a first member 11 which is pivotally connected to a mounting pad 12 about pin 13. A hole 14 is provided in the mounting pad 12 by means of which it may be attached to the drive shaft 15 of a conventional windscreen wiper drive system, by which the arm 10 may be driven for reciprocating pivotal movement about the axis of the drive shaft 15. The pivot connection about pin 13, permits the arm 10 to be pivotted back away from the windscreen 16 (FIG. 2) against a pair of springs 17 which are provided to hold the arm 10 and wiper blade (not shown) down against the windscreen 16.

A hydraulic actuator 18 is mounted on the member 11. The hydraulic actuator 18 has a stepped cylinder 19, having a large diameter bore 20 adjacet the mounting pad 12 and a relatively small diameter bore 21 extending beyond the opposite end of member 11.

A piston 22 is slidingly sealed in the large diameter bore 20. A grooved roller 23 is pivotted about pin 24 in the outer end of piston 22. A baffle plate 25 having a small orifice 26 is positioned against the shoulder of the stepped cylinder 19 and a compression spring 27 acts between the baffle plate 25 and a recessed inner end of piston 22, to urge piston 22 towards the open end of the large diameter bore 20.

A second member 28 forming an axial extension of member 12 is slidingly mounted on the small diameter portion of stepped cylinder 19, by means of a first bearing 29 at the end of the second member 28 and a second bearing 30 at the end of the stepped cylinder 19. A ram 31 is slidingly sealed within the small diameter bore 21 of the stepped cylinder 19 and a compression spring 32 acts between the ram 31 and the end of the cylinder 19 to urge the ram 31 towards the shoulder portion of the cylinder 19.

The free end 33 of ram 31 is secured to the second member 28. An extension 34 of the second member 28 is provided with a hook formation 35 to which may be attached a wiper blade (not shown) in conventional manner.

The drive shaft 15 is mounted substantially perpendicular to the windscreen 16 in bearing 40, which extends through a panel 41 adjacent the windscreen, and is secured thereto by means of nut 43. A cam formation 42 is secured coaxially of the drive shaft 15 by means of the nut 43.

When the arm 10 is in its operative position (as illustrated) the grooved roller 23 will engage the cam surface of cam formation 42 and will be maintained in engagement therewith by spring 27. Thus, as the arm 10 pivots on the drive shaft 15, the roller 23 will follow the cam surface of cam formation 42 and the piston 22 will be moved into and out of the bore 20 with the variations in the cam surface.

The chamber defined between the piston 22 and ram 31 is filled with hydraulic fluid, so that as piston 22 moves towards the shoulder of stepped cylinder 19, fluid will be forced out of the large diameter bore 20 and into the small diameter bore 21, thus urging the ram 31 against spring 32 and moving member 28 axially away from the drive shaft 15 to extend the arm 10. As the piston 22 moves away from the shoulder of the stepped cylinder 19, fluid will return to the large diameter bore 20 and the ram 31 and member 28 will be returned by spring 32. The variations in the surface of the cam formation 42 are thus transmitted to the member 28 to extend and contract the arm 10 as required. The relative diameters of the large and small diameter bores 20 and 21 are such that movement of the piston 22 due to variations in the surface of the cam formation 42, are multiplied to provide an appropriate movement of the member 28 and the wiper blade attached thereto.

As the wiper blade is moved outwardly from the drive shaft 15, a portion of the windscreen 16 adjacent the drive shaft 15 will not be swept by the blade. A secondary fixed wiper blade 50, which covers this inner portion of the windscreen 16, may be secured to member 11 so that it is carried by the arm 10 in parallel with the main wiper blade (not shown).

Various modifications may be made without departing from the invention. For example, in the above embodiment the large diameter bore 20 which defines a master cylinder, is formed integrally with the small diameter bore 21 which defines the ram. Alternatively, a master cylinder may be formed separately of the ram with suitable fluid connection therebetween. Futhermore, while the ram 31 is in the form of a piston which is mounted within the small diameter bore 21, the portion of member 28 which is slidable on cylinder 19 may alternatively constitute a sealed cylinder which is open to the small diameter bore and is itself filled with hydraulic fluid. While the wiper mechanism described above is suitable for single wiper blade systems, such mechanisms may be used in pairs etc.

I claim:

1. A windscreen wiper mechanism comprising a wiper arm including first and second members mounted with respect to one another so as to permit axial movement of one member relative to the other to vary the length of the arm, mounting means being provided on said first member by means of which the arm may be secured to one end of a pivot by which it may be driven in reciprocating manner, and means being provided on said second member by means of which a wiper blade may be attached, a cam being mounted in fixed relationship to said pivot adjacent said end of the pivot and a fluid operated means being mounted upon the arm for movement therewith, said fluid operated means being controlled by a cam follower which when the arm is mounted on said pivot engages and follows the cam as the arm is moved on the pivot, said fluid means controlling axial movement of the second member relative to the first.

2. A windscreen wiper mechanism according to claim 1 in which a stepped cylinder is mounted on the wiper arm, a piston being slidably sealed in the larger diameter bore of the stepped cylinder, movement of the piston being controlled by the cam follower as the wiper arm moves about its pivot, a ram being slidably sealed with respect to the smaller diameter bore and controlling movement of the second member of the wiper arm with respect to the first member.

3. A windscreen wiper mechanism according to claim 2 in which the second member is slidably supported on the small diameter portion of the stepped cylinder.

4. A windscreen wiper mechanism according to claim 1 in which spring means is provided to maintain the cam follower in engagement with the cam.

5. A windscreen wiper mechanism according to claim 1 in which spring means is provided to return the second member towards the first member.

* * * * *